(12) United States Patent
Omori

(10) Patent No.: US 8,942,118 B2
(45) Date of Patent: *Jan. 27, 2015

(54) MOBILE COMMUNICATION IN WHICH MONITORING BEACON SIGNAL ARRIVAL IS CHANGED BASED ON PROBABILITY OF TERMINAL-TO-ACCESS POINT CONNECTION

(75) Inventor: Yoshiaki Omori, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 106 days.

This patent is subject to a terminal disclaimer.

(21) Appl. No.: 13/292,741

(22) Filed: Nov. 9, 2011

(65) Prior Publication Data

US 2012/0057493 A1 Mar. 8, 2012

Related U.S. Application Data

(63) Continuation of application No. 12/278,873, filed as application No. PCT/JP2007/054238 on Mar. 6, 2007, now Pat. No. 8,085,699.

(30) Foreign Application Priority Data

Mar. 8, 2006 (JP) .................................. 2006-061984

(51) Int. Cl.
  *H04L 12/28* (2006.01)
  *H04W 48/16* (2009.01)
  *H04J 1/16* (2006.01)

(52) U.S. Cl.
  CPC ...................................... *H04W 48/16* (2013.01)
  USPC ............................ 370/252; 370/329; 370/430

(58) Field of Classification Search
  CPC ....................................................... H04W 48/16
  USPC .......................................... 370/252, 329, 430
  See application file for complete search history.

(56) References Cited

U.S. PATENT DOCUMENTS

| 5,828,661 | A | * | 10/1998 | Weaver et al. | ................. 370/331 |
| 7,177,294 | B2 | * | 2/2007 | Chen et al. | ..................... 370/338 |
| 2003/0054813 | A1 | | 3/2003 | Riley et al. | |
| 2003/0146835 | A1 | * | 8/2003 | Carter | ...................... 340/539.13 |
| 2004/0165563 | A1 | | 8/2004 | Hsu et al. | |

(Continued)

FOREIGN PATENT DOCUMENTS

| JP | 09297171 A | 11/1997 |
| JP | 10107722 A | 4/1998 |

(Continued)

OTHER PUBLICATIONS

European search report for EP07737813.1 dated Nov. 7, 2012.

(Continued)

*Primary Examiner* — John Pezzlo
(74) *Attorney, Agent, or Firm* — Sughrue Mion, PLLC

(57) ABSTRACT

A mobile communication terminal 10 receives "HCS_PRIO" of a notice data (System Information Block Type 3) of a base station 1 or 3, and determines whether the terminal 10 is present "indoor" and is in "a stationary state or a state moving at a low speed" based on the receiving result. Since there is a high possibility that the terminal 10 is connectable with a wireless LAN when the terminal 10 is present "indoor" and is in "a stationary state or a state moving at a low speed", the terminal 10 sets a period for monitoring arrival of a beacon signal.

42 Claims, 3 Drawing Sheets

(56) References Cited

U.S. PATENT DOCUMENTS

| | | | |
|---|---|---|---|
| 2004/0259546 A1 | 12/2004 | Balachandran et al. | |
| 2005/0085279 A1* | 4/2005 | Aoki | 455/574 |
| 2005/0099985 A1* | 5/2005 | Callaway et al. | 370/338 |
| 2007/0019771 A1* | 1/2007 | Ambuehl et al. | 375/372 |
| 2007/0060130 A1* | 3/2007 | Gogic et al. | 455/440 |
| 2008/0062918 A1* | 3/2008 | Ibrahim et al. | 370/328 |
| 2013/0053026 A1* | 2/2013 | Culpepper et al. | 455/426.1 |

FOREIGN PATENT DOCUMENTS

| | | | |
|---|---|---|---|
| JP | 11340903 A | 12/1999 | |
| JP | 2001095063 A | 4/2001 | |
| JP | 2002190769 A | 7/2002 | |
| JP | 2003169011 A | 6/2003 | |
| JP | 2003244741 A | 8/2003 | |
| JP | 2003309571 A | 10/2003 | |
| JP | 2003318915 A | 11/2003 | |
| JP | 2004320473 A | 11/2004 | |
| JP | 2005080071 A | 3/2005 | |
| JP | 2005260987 A | 9/2005 | |
| JP | 2005341296 A | 12/2005 | |
| WO | 0032002 A1 | 6/2000 | |
| WO | 2005006797 A1 | 1/2005 | |

OTHER PUBLICATIONS

"3rd Generation PartnershipProject; TechnicalSpecification Group RadioAccess Network; UserEquipment (UE) procedures inidle mode and procedures forcell reselection in connectedmode (Release 7)", 3GPPStandard; 3GPP TS 25.304, 3rdGeneration Partnership-Project (3GPP), MobileCompetence Centre; V7.0.0, Mar. 1, 2006, p. 1-38.

"3rd Generation Partnership Project; Technical Specification Group Radio Access Network; User Equipment (UE) Procedures in Idle Mode and Procedures for Cell Reselection in Connected Mode (Release 5)", 3GPP TS 25.304 V5.3.0 (Jun. 2003), pp. 1-41.

Japanese Office Action for JP2008-503853 mailed on Apr. 13, 2012.

\* cited by examiner

MOBILE COMMUNICATION IN WHICH MONITORING BEACON SIGNAL ARRIVAL IS CHANGED BASED ON PROBABILITY OF TERMINAL-TO-ACCESS POINT CONNECTION

REFERENCE TO RELATED APPLICATION

This is a continuation application of U.S. patent application Ser. No. 12/278,873 filed Aug. 8, 2008 now U.S. Pat. No. 8,085,699 and claims the benefit of its priority.

TECHNICAL FIELD

The present invention relates to a mobile communication terminal, and a communication system, a communication method and a control program using thereof. Especially, the present invention relates to a WCDMA (wideband code division multiple access) mobile communication terminal provided with a wireless LAN (local area network) communication function, and a communication system, a communication method and a control program using thereof.

BACKGROUND ART

A WCDMA communication terminal provided with a wireless LAN communication function is known in recent years. Such a mobile communication terminal is connected with a communication network such as internet through wireless communication with an access point for a wireless LAN, which is provided in places such as a station, an airport and a shopping center, to achieve data communication at relatively high speed. Users are generally satisfactory in many cases in terms of communication cost and communication speed more than communication services through WCDMA systems.

Meanwhile, a user of the mobile communication terminal is required to find out and go to a place where the access point for the wireless LAN is provided, and to start wireless LAN communication, if the user desires to receive benefits of such wireless LAN connection.

In order to allow automatic and prompt data communication through wireless LAN communication in an area where the wireless LAN communication is available, rather than starting the wireless LAN communication in response to an instruction from the user, the arrival of a so-called beacon signal transmitted from an access point for wireless LAN needs to be monitored constantly by the mobile communication terminal.

However, there is a problem of increased power consumption for constant monitoring. Therefore, it becomes important to efficiently monitor the arrival of a so-called beacon signal transmitted from the access point for wireless LAN.

By the way, as stated above, the access point for wireless LAN is often provided in places such as a station, an airport and a shopping center, or "indoors". Furthermore, an area where communication with the access point for wireless LAN is possible is relatively narrow with a radius of several tens to 200 meters. Therefore, when moving at high speed, the mobile communication terminal has a low possibility of detecting the beacon signal transmitted from the access point for wireless LAN or tends to go beyond a communicable area of the access point soon even after detecting the beacon signal. In either case, it is difficult to receive wireless LAN service.

Considering the above two points, whether a wireless LAN connection is possible is divided into the following cases:

1) When the mobile communication terminal is stationary or moving at a low speed:
It is highly probable to achieve the wireless LAN connection as long as the mobile communication terminal is present indoors. However, a probability of achieving the wireless LAN connection is low if the mobile communication terminal is present outdoors.
2) When the mobile communication terminal is moving at a high speed:
There is a low probability of achieving the wireless LAN connection in both cases that the mobile communication terminal is present indoors and outdoors.

In this way, whether or not the wireless LAN connection can be achieved is dependent on conditions (i.e. position and speed) of the mobile communication terminals.

Japanese Patent Application Publication (JP-P2005-080071A) discloses a mobile communication terminal. The mobile communication terminal measures a position thereof by GPS (global positioning system) makes a determination to search an access point of for wireless LAN when the mobile communication terminal approaches the wireless LAN access point.

Japanese Patent Application Publication (JP-P2003-169011A) discloses a mobile communication terminal. At the time of waiting and receiving two kinds of signals with frequencies f1 and f2, the mobile communication terminal changes a period to receive the signal with the frequency f2 which differs from the signal with the predetermined frequency f1 in accordance with a moving speed of the mobile communication terminal.

Japanese Patent Application Publication (JP-P2003-309571A) discloses a wireless LAN system. According to this technique, a wireless terminal receives a beacon signal from an access points in a predetermined period.

Japanese Patent Application Publication (JP-P2003-318915A) discloses an information processing apparatus. The information processing apparatus determines whether it is present indoors or outdoors by a power source supplied from an AC adapter or a battery.

Japanese Patent Application Publication (JP-P2005-260987A) discloses a communication system. According to this conventional technique, a communication control section of a base station sets a period to transmit a beacon signal on the basis of a setting request received from a terminal station.

Japanese Patent Application Publication (JP-P2001-95063A) discloses a wireless receiver driven with a battery. The wireless receiver determines whether a transmission signal transmitted from a wireless transmitter non-periodically is present in accordance with a predetermined intermittent period. The wireless receiver changes the intermittent period in accordance with a usage state.

Japanese Patent Application Publication (JP-P2002-190769A) discloses a mobile communication apparatus. The mobile communication apparatus detects a reception level in order to determine whether or not the mobile communication apparatus is moving on the basis of variation history of the detected reception level.

There is also a paper "3GPP TS25.304 V5.3.0 (2003-06)" which discloses a technique to execute a switching process from a cell, where a mobile communication terminal receives services during moving at present to another cell by using data for HCS (hierarchical cell configuration).

DISCLOSURE OF INVENTION

According to communication systems in related art, the arrival of a beacon signal is constantly monitored regardless that whether the wireless LAN connection is possible is dependent on conditions (i.e. position and speed) of the mobile communication terminal. Therefore, power consumption increases in the mobile communication terminal.

Therefore, an objective of the present invention is to provide a mobile communication terminal which can monitor the arrival of a beacon signal transmitted from an access point for wireless LAN more efficiently than in the related arts, and a communication system, a communication method and a control program using the same.

The mobile communication terminal according to the present invention can communicate with a first base station, a second base station and a wireless LAN access point, respectively. The second base station is present within a service area of the first base station, having a service area which is smaller than that of the first base station. The wireless LAN access point is present within the service area of the second base station. The mobile communication terminal according to the present invention includes a determining section and a changing section. The determining section receives a specific signal transmitted from the first or second base station and determines whether or not it is highly probable for the mobile communication terminal itself to be connected to the wireless LAN access point, in accordance with the reception result. The changing section changes a period to monitor the arrival of the beacon signal transmitted from the wireless LAN access point on the basis of the determination results obtained from the determining section.

A communication system according to the present invention includes a first base station, a second base station, a wireless LAN access point and a mobile communication terminal. The second base station is present within a service area of the first base station, having a service area which is smaller than that of the first base station. The wireless LAN access point is present within the service area of the second base station. The mobile communication terminal can communicate with these first and second base stations and the wireless LAN access point. The mobile communication terminal includes a determining section and a changing section. The determining section receives a specific signal transmitted from the first or second base station and determines whether or not it is highly probable for the mobile communication terminal itself to be connected to the wireless LAN access point in accordance with the reception result. The changing section changes a period to monitor the arrival of a beacon signal transmitted from the wireless LAN access point on the basis of the determination results obtained from the determining section.

A communication method according to the present invention is used in a communication system which includes a first base station, a second base station, a wireless LAN access point and a mobile communication terminal. The second base station is present within a service area of the first base station, having a service area which is smaller than that of the first base station. The wireless LAN access point is present within the service area of the second base station. The mobile communication terminal can communicate with these first and second base stations and the wireless LAN access point. The communication method according to the present invention includes: (A) the mobile communication terminal receiving a specific signal transmitted from the first or second base station and determining whether or not it is highly probable for the terminal itself to be connected to the wireless LAN access point in accordance with the reception result; and (B) the mobile communication terminal changing a period to monitor the arrival of the beacon signal transmitted from the wireless LAN access point on the basis of the determination result obtained in the above determination step.

A control program according to the present invention is provided for a communication method used in a communication system which includes a first base station, a second base station, a wireless LAN access point and a mobile communication terminal. The second base station is present within a service area of the first base station, having a service area which is smaller than that of the first base station. The wireless LAN access point is present within a service area of the second base station. The mobile communication terminal can communicate with these first and second base stations and the wireless LAN access point. The control program according to the present invention is stored in the mobile communication terminal. The control program causes a computer to execute: (A) receiving a specific signal transmitted from the first or second base station and determining whether or not it is highly probable for the mobile communication terminal itself to be connected to the wireless LAN access point in accordance with the reception result; and (B) the mobile communication terminal changing a period to monitor the arrival of the beacon signals transmitted from the wireless LAN access point on the basis of the determination results obtained in the above determination step.

Next, effects of the present invention will be described. In the present invention, characteristics of the wireless LAN access point as stated in the above 1) and 2) are considered to determine whether a probability of achieving the wireless LAN connection is high or low, followed by changing a period to monitor the arrival of so-called beacon signals transmitted from the wireless LAN access point. More specifically, a period to monitor the arrival of the beacon signals is made shorter when it is determined that a probability of achieving the wireless LAN connection is high, as opposed to extend a period to monitor the arrival of the beacon signals (or discontinue the monitoring) when the probability of achieving the wireless LAN connection is determined to be low.

Therefore, reduction of power spent for monitoring the beacon signals from the wireless LAN access point can be compatible with usability of executing data communication through the wireless LAN by detecting the wireless LAN access point promptly in an area where the wireless LAN connection is available.

According to the present invention, the arrival of the beacon signals transmitted from the access point for the wireless LAN can be monitored more efficiently than conventional techniques owing to include the aforementioned configuration.

BEST MODE FOR CARRYING OUT THE INVENTION

Hereinafter, a mobile communication terminal of the present invention, and a communication system, a communication method and control program using the same will be described with reference to the attached drawings.

First Exemplary Embodiment

Figure 1:
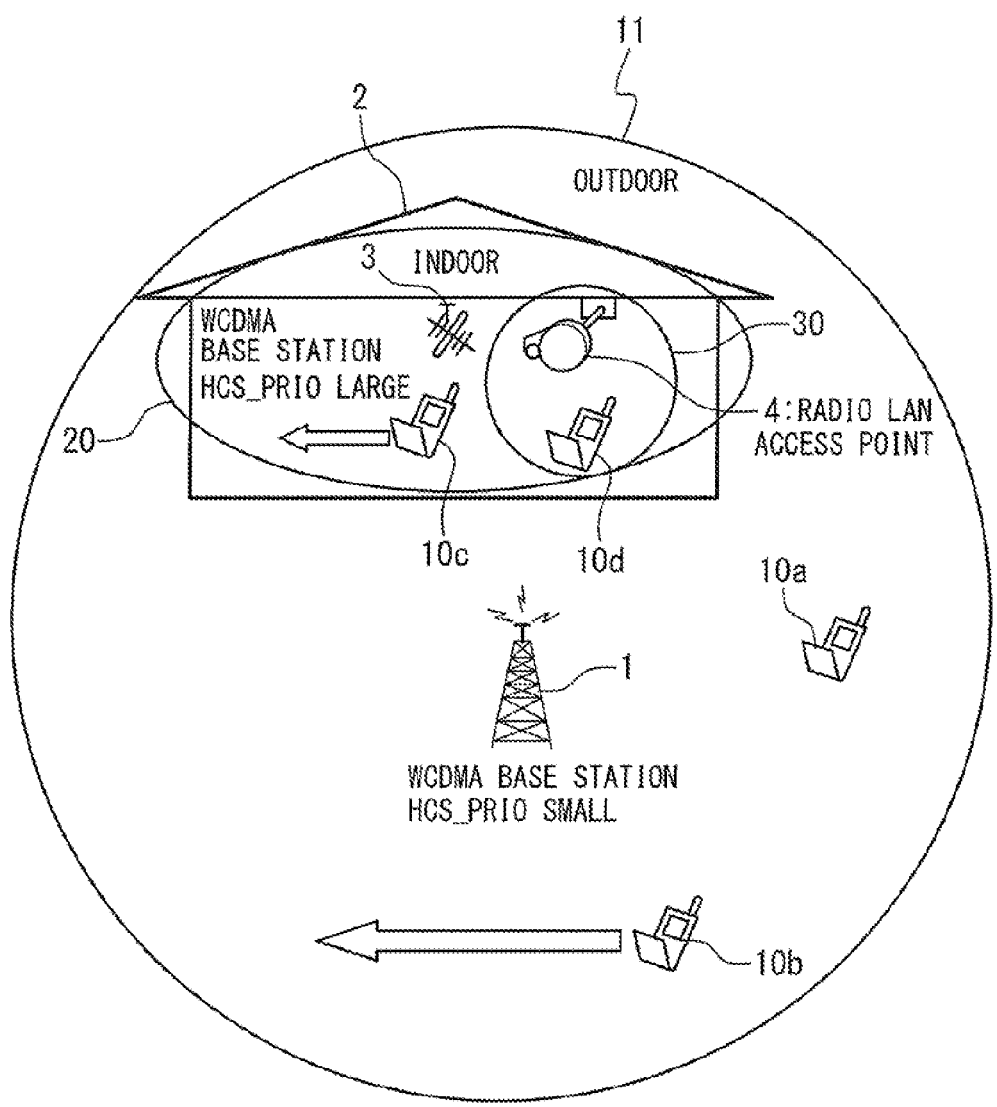
FIG. 1 is a conceptual diagram showing an example of a configuration of the communication system according to the present invention.

FIG. 1 shows an example of a configuration of a communication system according to the present invention. In FIG. 1, the communication system includes a WCDMA base station 1, a service area (outdoor) 11 of the WCDMA base station 1, a mobile communication terminal (stationary) 10a and a mobile communication terminal (moving at high speed) 10b which are present in the service area 11, a building 2 provided in the service area (outdoor) 11, a WCDMA base station 3 provided in the building 2; a service area (indoor) 20 of the WCDMA base station 3, a wireless LAN access point 4 provided in the service area (indoor) 20, a service area (indoor) 30 of the wireless LAN access point 4, a mobile communication terminal (moving at high speed) 10c which is present in the service area (indoor) 20, and a mobile communication terminal (stationary) 10d which is present in the service area (indoor) 30.

FIG. 1 shows, as one exemplary embodiment of the present invention, the WCDMA base station 1 provided outdoors, the WCDMA base station 3 provided indoors, the wireless LAN access point 4 provided indoors, and the mobile communication terminals 10a to 10d which are present within the respective service areas.

The mobile communication terminal 10a is present in the service area (outdoor) 11 of the WCDMA base station 1 and stationary.

The mobile communication terminal 10b is present in the service area (outdoor) 11 of the WCDMA base station 1 and moving at high speed.

The mobile communication terminal 10c is present in the service area (indoor) 20 of the WCDMA base station 3 and moving at high speed.

The mobile communication terminal 10d is present in the service area (indoor) 30 of the wireless LAN access point 4 and stationary.

Therefore, according to the characteristics of the wireless LAN access point indicated in the above 1) and 2), only the mobile communication terminal 10d has a high probability of achieving a wireless LAN connection.

Figure 2:
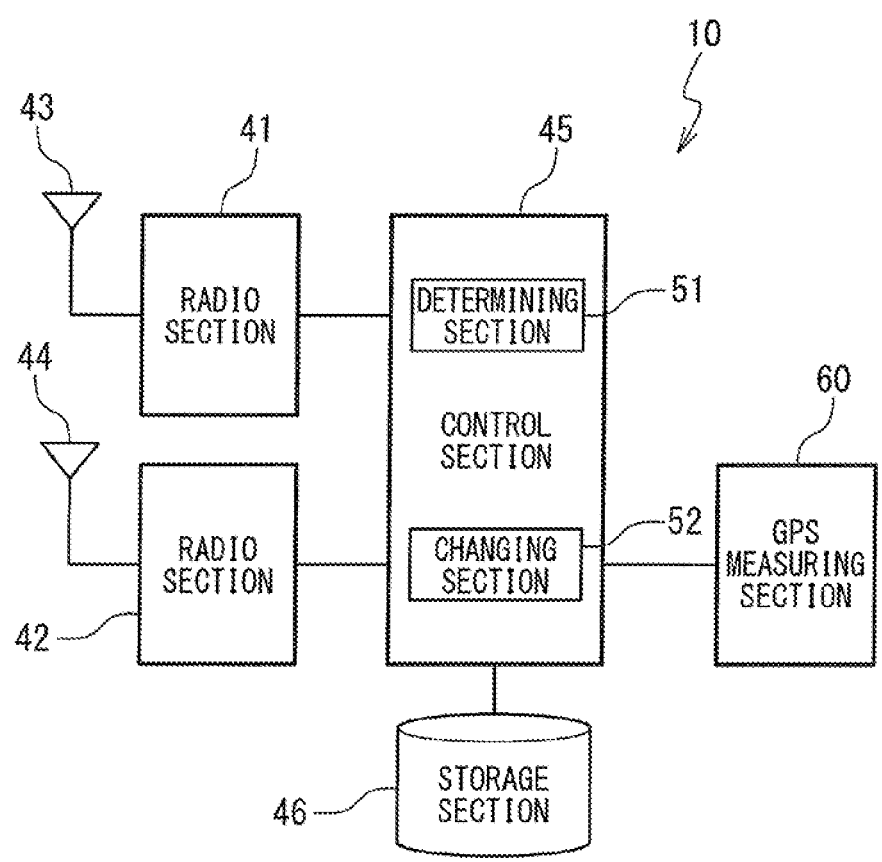
FIG. 2 is a block diagram showing an example of a configuration of mobile communication terminal according to the present invention.

Next, an example of the configuration of the mobile communication terminal 10 will be described. FIG. 2 is a block diagram showing the configuration of the mobile communication terminal 10 according to the present invention. In FIG. 2, the mobile communication terminal 10 (i.e., 10a to 10d) is provided with radio sections 41 and 42, antennas 43 and 44, a control section 45 and a main body storage section 46. The mobile communication terminal 10 may also be further provided with a GPS positioning section 60.

The radio sections 41 and 42, the storage section 46 and the GPS positioning section 60 are connected to the control section 45. The antenna 43 is connected to the radio section 41 and the antenna 44 is connected to the radio section 42. The radio section 41 corresponds to a WCDMA system, and the radio section 42 corresponds to a wireless LAN system.

The storage section 46 stores a program and data required to realize control by the control section 45. The control section 45 controls the radio sections 41 and 42 and the storage section 46. The control section 45 also includes a determining section 51 and a changing section 52.

Next, a method of determining whether the mobile communication terminal 10 (i.e., 10a to 10d) is present indoors or outdoors will be described. The method corresponds to the method described in the document 3GPP TS25.304 V5.3.0 (2003-06). The determination is made by the determining section 51 of the control section 45.

The mobile communication terminal 10 receives a parameter "HCS_PRIO" included in a notice data (i.e. system information block type 3) from a base station from which the services are received at present. When the parameter "HCS_PRIO" exhibits a value equals to or larger than a certain threshold value (e.g. in case of the WCDMA base station 3 shown in FIG. 1), the mobile communication terminal 10 receives the services from a base station whose cover area is relatively small as in an area within a building (e.g. building 2). Accordingly, the determining section 51 of the control section 45 determines the mobile communication terminal 10 is present "indoors".

In contrast, if the parameter "HCS_PRIO" whose value is less than a certain threshold value (e.g. in case of the WCDMA base station 1 shown in FIG. 1), the mobile communication terminal 10 receives the services from a base station having a relatively large cover area. Accordingly, the determining section 51 of the control section 45 determines the mobile communication terminal 10 is present "outdoors".

The HCS function described in the document 3GPP TS25.304 V5.3.0 (2003-06) can also be similarly used in a method of determining whether the mobile communication terminal 10 (i.e. 10a to 10d) is "stationary or moving at low speed" or "moving at high speed". That is, a "high-mobility state" (which is a state where cell reselection is generated for N_CR times within a time period of T_CRmax) is determined as "moving at high speed". Other cases (i.e. in a state where cell reselection is not observed for N_CR times within a time period of T_CRmax+T_CRmaxHyst) are determined as "stationary or moving at low speed".

HCS is described in the above-stated document 3GPP TS25.304 V5.3.0 (2003-06). In the above "high-mobility state", the mobile communication terminal selects a base station having low "HCS_PRIO" (which is generally allocated to a base station whose cover area is large) with priority. In contrast, the mobile communication terminal selects a base station having large "HCS_PRIO" (which is generally allocated to a base station whose cover area is small) with priority in cases other than the "high-mobility state". That is, the frequency of having cell reselection can be suppressed by selecting a base station having a large cover area when the mobile communication terminal is moving at high speed. In cases other than moving at high speed, it is allowed to select base stations having a small cover area such as within a building.

It should be noted "HCS_PRIO", "T_CRmax", "T_CRmaxHyst" and "N_CR", which are parameters used in HCS, are notified to the mobile communication terminal 10 by the notice data (i.e. system information block type 3) from the base station. It should be also noted that "cell reselection" means moving from a cell, from which the mobile communication terminal receive services at present, to another cell.

The determining section 51 of the control section 45 determines a current state (i.e. position and speed) of the terminal 10 itself by WCDMA communication using the radio section 41. The changing section 52 of the control section 45 changes a period to monitor an arrival of a beacon signal received through the wireless LAN by using the radio section 42 on the basis of the determination result.

According to the first exemplary embodiment of the present invention, the mobile communication terminal 10 determines whether a probability of achieving the wireless LAN connection is high or low based on the data obtained in the WCDMA system. The mobile communication terminal 10 further determines a period to monitor the arrival of so-called beacon signal transmitted from the wireless LAN access point on the basis of the determination result. As a result, the wireless LAN access point can be promptly detected in an area where the probability of achieving the wireless LAN connection is high, whereby data communication through the wireless LAN can be performed. In contrast, in an area where the probability of achieving the wireless LAN connection is low, power spent for monitoring the beacon signal transmitted from the wireless LAN access point can be reduced.

In the first exemplary embodiment, whether the mobile communication terminal 10 is present "indoors" or "outdoors" and whether it is "stationary or moving at low speed" or "moving at high speed" are determined by using a method based on the WCDMA standard (refer to the document 3GPP TS25.304). Accordingly, it is not necessary to add new base station parameters, make 3GPP functional changes and add new devices to the terminal for the purpose of these determinations.

Figure 3:
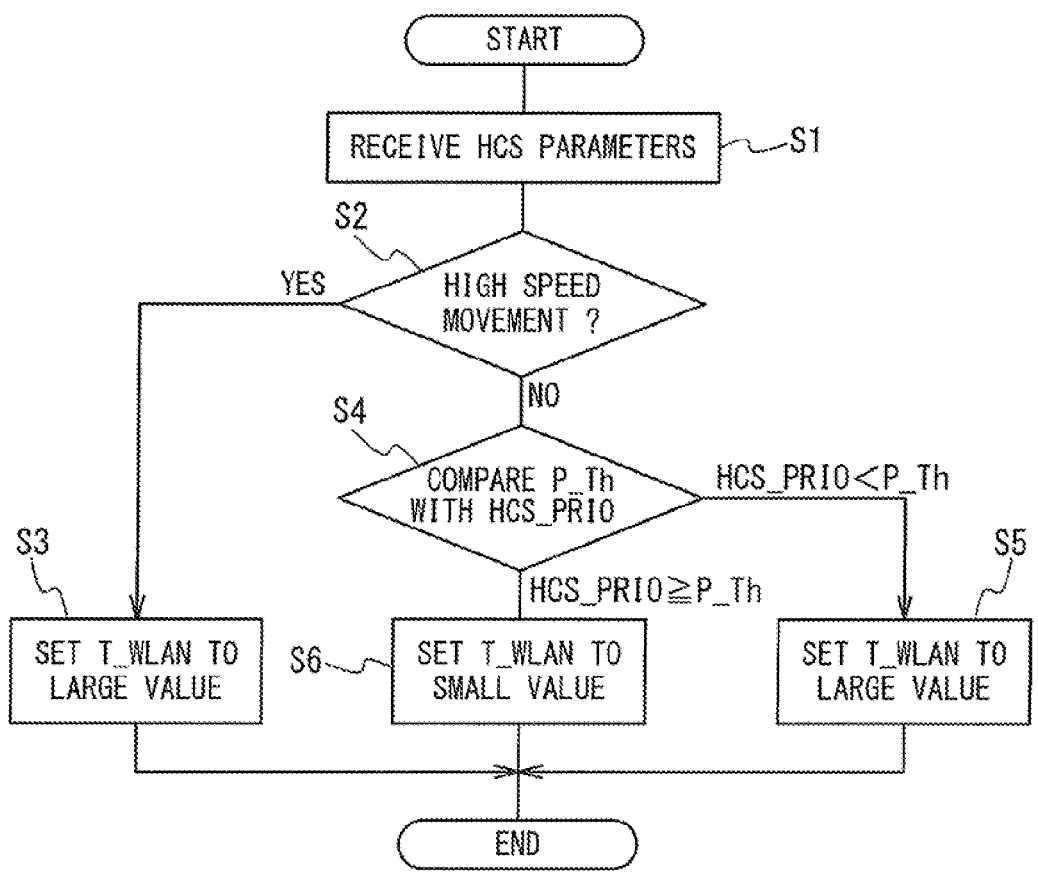
FIG. 3 is a flowchart showing an example of the communication method according to the present invention.

FIG. 3 is a flowchart showing an example of a communication method according to the first exemplary embodiment of the present invention. It is assumed that the control section 45 of the mobile communication terminal 10 monitors the arrival of so-called beacon signal received from the wireless LAN access point by using the radio section 42 in a T_WLAN period of a timer (not shown).

First, the control section 45 controls the radio section 41 to receive notice data (i.e. system information block type 3) transmitted from the WCDMA base station from which services are received at present in order to receive various kinds of parameters including "HCS_PRIO", "T_CRmax", "T_CRmaxHyst" and "N_CR" (step S1).

Next, the determining section 51 of the control section 45 determines whether or not the mobile communication terminal 10 is in the "high-mobility state" (i.e. moving at high speed) by the method described in the aforementioned document (3GPP TS25.304) (step S2). More specifically, the determining section 51 of the control section 45 monitors a frequency of cell reselection within unit time (T_CRmax). If the frequency exceeds N_CR times, the determining section 51 determines that the mobile communication terminal is in the "high-mobility" state (i.e. moving at high speed) (step S2: Yes). In contrast, if cell reselection is not observed for N_CR times within the unit time (T_CRmax+T_CRmaxHyst), the determining section 51 determines that the mobile communication terminal is not in the "high-mobility state" (i.e. not moving at high speed but stationary or moving at low speed) (step S2: No).

If the determining section 51 determines that the terminal 10 itself is moving at high speed (step S2: Yes), the terminal 10 itself has a low probability of detecting the beacon signal transmitted from the wireless LAN access point 4 or tends to go beyond a communicable area of the wireless LAN access point 4 soon after detecting the beacon signal. From this reason, the changing section 52 of the control section 45 sets the aforementioned period T_WLAN of the timer to a relatively large value (e.g. 1 minute) (step S3).

Meanwhile, if the determining section 51 determines that the terminal 10 itself is not moving at high speed (step S2: No), the determining section 51 compares "HCS_PRIO" of the WCDMA base station, from which services are received at present, with a threshold value (referred to as "P_Th" hereinafter) (step S4).

If "HCS_PRIO" exhibits a value which is less than "P_Th" (step S4: HCS_PRIO<P_Th), the determining section 51 determines the WCDMA base station, from which services are received at present, has a large service area (i.e. the terminal 10 itself is present outdoors). In this case, the terminal 10 has a low probability of detecting the beacon signal transmitted from wireless LAN access point which is often provided indoors. From this reason, the changing section 52 of the control section 45 sets the aforementioned period T_WLAN of the timer to a relatively large value (e.g. one minute) (step S5).

In contrast, if "HCS_PRIO" exhibits a value which is equal to or longer than P_Th (step S4: HCS_PRIO·P_Th), the determining section 51 determines that a WCDMA base station, from which services are received at present, has a small service area (i.e. the terminal 10 itself is present indoors). In this case, it is highly probable that the terminal 10 itself detects the beacon signal transmitted from the wireless access point which is often provided indoors. From this reason, the changing section 52 of the control section 45 sets the aforementioned period T_WLAN of the timer to a relatively small value (e.g. 10 seconds) (step S6).

In this way, the method of controlling the mobile communication terminal according to the present invention includes the steps of: determining whether a probability of achieving the wireless LAN connection is high or low on the basis of data obtained from a WCDMA system through which services are received; and determining a period to monitor the arrival of beacon signal transmitted from the wireless LAN access point on the basis of the determination result. The process according to the present exemplary embodiment is therefore realized and the aforementioned effects can be obtained.

Second Exemplary Embodiment

In the communication system according to a second exemplary embodiment of the present invention, a GPS function is used to determine whether the mobile communication terminal 10 is present "indoors" or "outdoors". That is, the mobile communication terminal 10 includes the GPS positioning section 60 which is controlled by the control section 45. The GPS positioning section 60 receives position measurement signals transmitted from a plurality of GPS satellites. The control section 45 calculates a current position of the terminal 10 itself on the basis of these signals.

In the present exemplary embodiment, instead of calculating a current position of the terminal 10 itself from the position measurement signals, whether the terminal 10 is present "indoors" or "outdoors" is determined from the number of GPS satellites captured by the GPS positioning section 60 at present. More specifically, if the number of captured GPS satellites is equal to or less than a predetermined number, the determining section 51 of the control section 45 determines that the terminal 10 itself entered "indoors". In contrast, if the number of captured GPS satellites exceeds the predetermined number, the determining section 51 determines that the terminal 10 itself went "outdoors". On the basis of these determinations, the changing section 52 of the control section 45 changes a period to monitor the beacon signal transmitted from the wireless LAN access point.

According to the present exemplary embodiment, whether the terminal 10 itself is present "indoors" or "outdoors" is determined by using the GPS satellites. Positional data of the terminal obtained from GPS satellites is not used here. That is, the present exemplary embodiment differs from a technique disclosed in Japanese Patent Application Publication (JP-P2005-080071A) in which whether a terminal is present close to the wireless LAN access point is determined from a position of the terminal obtained from GPS satellites and a position of the wireless LAN access point stored in advance and wireless LAN searching is performed if the terminal is close to the wireless LAN access point. According to the present exemplary embodiment, the effects can be obtained that the data on the position of the wireless LAN access point does not need to be known in advance.

Moreover, when no signal from GPS satellites can be received, it is determined that the terminal entered "indoors". Therefore, the present invention can be applied to indoor usage in which signals from GPS satellites are unreachable, which differs from the invention disclosed in the aforementioned Japanese Patent Application Publication (JP-P2005-080071A).

Third Exemplary Embodiment

In the communication system according to a third exemplary embodiment of the present invention, whether the mobile communication terminal 10 is present "indoors" or "outdoors" is determined on the basis of a scrambling code used by a WCDMA base station (i.e. WCDMA base station 3 shown in FIG. 1) provided in the vicinity of an area in which communication with the wireless LAN access point 4 is available. More specifically, a scrambling code used by the WCDMA base station 3 is set to a specific one, and if a base station (i.e. WCDMA base station 3) using this scrambling code is detected, the control section 45 determines that the terminal 10 itself is present "indoors".

In contrast, the control section 45 determines that the terminal 10 is present "outdoors" as long as the base station (i.e. WCDMA base station 3) using this scrambling code is not detected.

It should be noted that the specific scrambling code can be distinguished by using, for example, "code groupe of 60 to 64" and "primary code number of 7 to 8" or the like in (primary) scrambling codes used in base stations. It should be noted that this method needs to correspond to both the base station 3 and the mobile communication terminal 10. That is, recognition of scrambling codes used in both of them needs to be adjusted in advance.

According to the present exemplary embodiment, a scrambling code of the WCDMA base station can be used to determine whether the mobile phone is present "indoors" or "outdoors".

Fourth Exemplary Embodiment

In the communication system according to a fourth exemplary embodiment of the present invention, whether the mobile communication terminal 10 is present "indoors" or "outdoors" is determined on the basis of a signal having a specific frequency to be used by a WCDMA base station (i.e. WCDMA base station 3 shown in FIG. 1) which is provided in the vicinity of a communicable area of the wireless LAN access point 4. If the base station using this frequency is detected, the control section 45 determines that the terminal 10 itself is present "indoors". More specifically, the frequency used by the WCDMA base station 3 is set to a specific one and if the base station using this frequency (i.e. WCDMA base station 3) is detected, the control section 45 determines that the terminal 10 itself is present "indoors".

In contrast, the control section 45 determines that the terminal 10 itself is present "outdoors" as long as the base station using this frequency (i.e. WCDMA base station 3) is not detected.

It should be noted the specific frequency can be distinguished by using, for example, "WCDMA1.7 GHz band" and "UARFCN (which is a number expressing a frequency and can be converted to a frequency by multiplying it by 0.2 times) of 10551 to 10600" or the like in frequencies used by base stations. This method needs to correspond to both the base station 3 and the mobile communication terminal 10. That is, recognition of frequencies used in both of them needs to be adjusted in advance.

According to the fourth exemplary embodiment, a specific frequency used by the WCDMA base station can be used to determine whether the mobile phone is present "indoors" or "outdoors".

Fifth Exemplary Embodiment

In the communication system according to a fifth exemplary embodiment of the present invention, parameters ● and ●, which differ from the HCS parameters (i.e. "T_CRmax", "T_CRmaxHyst" and "N_CR"), are used to determine whether the mobile communication terminal 10 is "stationary or moving at low speed" or "moving at high speed". More specifically, the parameters ● and ●, which differ from the HCS parameters (i.e. "T_CRmax", "T_CRmaxHyst" and "N_CR"), are set in the mobile communication terminal 10 in advance. Then, if the frequency of having cell reselection per unit time ● is equal to or more than a fixed number ●, the control section 45 determines that the terminal 10 itself is "moving at high speed". In contrast, if the frequency is less than the fixed number ●, the control section 45 determines that the terminal 10 itself is "stationary or moving at low speed".

According to the fifth exemplary embodiment, the parameters ● and ●, which differ from the HCS parameters (i.e. "T_CRmax", "T_CRmaxHyst" and "N_CR"), can be used to determine whether the mobile phone is "stationary or moving at low speed" or "moving at high speed".

Sixth Exemplary Embodiment

The parameters ● and ●, which differ from the HCS parameters (i.e. "T_CRmax", "T_CRmaxHyst" and "N_CR"), are used in the communication system according to sixth exemplary embodiment of the present invention in the same manner as the fifth exemplary embodiment in order to determine whether the mobile communication terminal 10 is "stationary or moving at low speed" or "moving at high speed". More specifically, if the frequency of having handover (which is a process to change (or move from/to) the base station during communication) per the unit time ● is equal to or more than the fixed number ●, the control section 45 determines that the terminal 10 itself is "moving at high speed". In contrast, if the frequency is less than the fixed number ●, the control section 45 determines that the terminal 10 itself is "stationary or moving at low speed".

The sixth exemplary embodiment makes it possible to use the frequency of handover as a determination reference, as opposed to using the frequency of cell reselection as a determination reference according to the fifth exemplary embodiment.

Seventh Exemplary Embodiment

Next, a seventh exemplary embodiment will be described. Since the aforementioned HCS is a relatively new function, it is considered that HCS is not applied to many base stations in practical use. That is, the parameters related to HCS are not yet entered to notice data of base stations in many cases. Therefore, when services are received from the base stations to which HCS is applied, whether the mobile terminal is present "indoors" or "outdoors" and whether the mobile terminal is "stationary or moving at low speed" or "moving at high speed" are determined by the method using the HCS as described in the first exemplary embodiment. In contrast, when services are received from the base stations to which HCS is not applied, whether the terminal is present "indoors" or "outdoors" and whether the terminal is "stationary or moving at low speed" or "moving at high speed" are determined by a method in which HCS described in the second to sixth exemplary embodiments is not used.

According to a seventh exemplary embodiment, the present invention is applicable to both of base stations with application of HCS and without application of HCS.

Eighth Exemplary Embodiment

In the already provided exemplary embodiments, the period T_WLAN of the timer is set to a relatively large value (e.g. one minute) in an area having a low probability of achieving the wireless LAN connection (refer to steps S3 and S5 shown in FIG. 3). This period T_WLAN may also be set to infinite value. In this case, the system is operated in such a manner that the beacon signal transmitted from the wireless LAN access point is not monitored in the area having the low probability of achieving the wireless LAN connection because the timer does not expire.

In the already provided exemplary embodiments, the period T_WLAN of the timer is also set to two kinds of values which are a large value and a small value (refer to steps S3, S5 and S6 shown in FIG. 3). This period T_WLAN is not limited to the two kinds. For example, two kinds of P_Th1 and P_Th2 are prepared as P_Th for comparison with HCS_PRIO in step S4 shown in FIG. 3 (e.g. P_Th1 is smaller than P_Th2). The period T_WLAN of the timer is then determined as follows in place of steps S5 and S6.

If HCS_PRIO is smaller than P_Th1, the period T_WLAN of the timer is set to a large value (e.g. one minute) (step S7).

If HCS_PRIO is equal to or larger than P_Th1 and smaller than P_Th2, the period T_WLAN of the timer is set to an intermediate value (e.g. 30 seconds) (step S8).

If HCS_PRIO is equal to or larger than P_Th2, the period T_WLAN of the timer is set to a small value (e.g. 10 seconds) (step S9).

Although two kinds of P_Th are used in the above case, three or more kinds of P_Th may also be used.

According to the eighth exemplary embodiment, power consumption can be further reduced in the mobile communication terminal. Alternatively, the period of the timer can be adjusted more finely.

Ninth Exemplary Embodiment

In the already provided exemplary embodiments, the system in which the wireless LAN is combined with the WCDMA system has been described. The present invention is also applicable to a combination with other wireless systems. For example, the present invention is applicable to the mobile communication terminal corresponding to the wireless LAN and a GSM (global system for mobile communication) system. Since it is impossible to apply the method using the HCS to systems other than the WCDMA system, the present exemplary embodiment changes the period T_WLAN of the timer according to the methods in which the HCS as described in the second to seventh exemplary embodiments is not used.

According to a ninth exemplary embodiment, the present invention can be applied to a combination of the wireless LAN and the GSM system.

Tenth Exemplary Embodiment

Although a combination of two systems including the wireless LAN and the WCDMA system or the wireless LAN and the GSM system has been described in the already provided exemplary embodiments, the present invention can also be made to correspond to a combination of three or more systems. For example, the mobile communication terminal corresponding to the wireless LAN, the WCDMA system and the GSM system may also be provided. In a certain moment, a wireless system receiving services is either WCDMA or GSM. A wireless system receiving services at this time can be used to change the period T_WLAN of the timer in accordance with any one of the methods according to the already provided exemplary embodiments.

According to a tenth exemplary embodiment, the present invention is applicable to a combination of three or more systems.

Eleventh Exemplary Embodiment

In the communication system according to an eleventh exemplary embodiment of the present invention, a control program for the communication method is provided. The storage section 46 of the mobile communication terminal 10 stores a program and data required to realize a control by the control section 45. That is, the storage section 46 stores a control program to cause a computer (which corresponds to the control section 45) to execute the processes according to the already provided exemplary embodiments.

The control section 45 reads the control program from the storage section 46 in order to control the radio sections 41 and 42 in accordance with the program. Contents of the control are already described and the description thereof will be omitted.

In the eleventh exemplary embodiment of the present invention, the control program can be obtained by which effects shown in the already provided exemplary embodiments can be exhibited.

The invention claimed is:

1. A mobile communication terminal which can communicate with a first base station, a second base station which is present within a service area of said first base station, and has a service area which is smaller than that of said first base station, and a wireless LAN access point, which is present within a service area of said second base station, said mobile communication terminal comprising:
    a determining section configured to receive a specific signal transmitted from said first or second base station and to determine whether or not there is a high possibility that said mobile communication terminal is connected to said wireless LAN access point, based on a reception result; and
    a changing section configured to change a period to monitor arrival of a beacon signal transmitted from said wireless LAN access point based on the determination result of said determining section,
    wherein the period is changed based on a probability that a connection with said wireless LAN access point can be achieved, and the period is shortened when the probability increases and is lengthened when the probability decreases.

2. The mobile communication terminal according to claim 1, wherein said determining section acquires a data of a current position and current moving speed of said mobile communication terminal from the specific signal and determines whether or not there is the high possibility that said mobile communication terminal is connected to said wireless LAN access point, based on the data.

3. The mobile communication terminal according to claim 1, wherein said first and second base stations are base stations of a WCDMA (wideband Code Division Multiple Access) system.

4. The mobile communication terminal according to claim 1, wherein the specific signal is a predetermined parameter of a notice data.

5. The mobile communication terminal according to claim 4, wherein the notice data is a System Information Block Type 3, and the predetermined parameter is HCS_PRIO.

6. The mobile communication terminal according to claim 1, wherein the specific signal which is transmitted from said second base station is a Scrambling Code signal.

7. The mobile communication terminal according to claim 1, wherein the specific signal which is transmitted from said second base station is a signal with a specific frequency.

8. The mobile communication terminal according to claim 1, wherein the specific signal is a signal of data indicating a number of times of Cell Reselection by said mobile communication terminal.

9. The mobile communication terminal according to claim 1, wherein the specific signal is a signal of data indicating a number of times of Handover of said mobile communication terminal.

10. The mobile communication terminal according to claim 1, wherein said first and second base stations are base stations of a GSM (Global system Mobile Communication) system.

11. The mobile communication terminal of claim 1, wherein the probability increases with decreasing speed of the mobile communication terminal, and the probability decreases with increasing speed of the mobile communication terminal.

12. The mobile communication terminal of claim 1, wherein the probability changes based on one or more attributes of a current position of the mobile communication terminal.

13. A communication system comprising: a mobile communication terminal which can communicate with a first base station, a second base station which is present within a service area of said first base station, and has a service area which is smaller than that of said first base station, and a wireless LAN access point, which is present within a service area of said second base station, wherein said mobile communication terminal comprises:
a determining section configured to receive specific signals transmitted from said first base station or said second base station and to determine whether or not there is a high possibility that said mobile communication terminal is connected to said wireless LAN access point, based on a reception result; and
a changing section configured to change a period to monitor arrival of a beacon signal transmitted from said wireless LAN access point based on the determination result of said determining section,
wherein the period is changed based on a probability that a connection with said wireless LAN access point can be achieved, and the period is shortened when the probability increases and is lengthened when the probability decreases.

14. The communication system according to claim 13, wherein said determining section acquires a data of a current position and current moving speed of said mobile communication terminal from the specific signal and determines whether or not there is the high possibility that said mobile communication terminal is connected to said wireless LAN access point, based on the data.

15. The communication system according to claim 13, wherein said first and second base stations are base stations of a WCDMA (wideband Code Division Multiple Access) system.

16. The communication system according to claim 13, wherein the specific signal is a predetermined parameter of a notice data.

17. The communication system according to claim 16, wherein the notice data is a System Information Block Type 3, and the predetermined parameter is HCS_PRIO.

18. The communication system according to claim 13, wherein the specific signal which is transmitted from said second base station is a Scrambling Code signal.

19. The communication system according to claim 13, wherein the specific signal which is transmitted from said second base station is a signal with a specific frequency.

20. The communication system according to claim 13, wherein the specific signal is a signal of data indicating a number of times of Cell Reselection by said mobile communication terminal.

21. The communication system according to claim 13, wherein the specific signal is a signal of data indicating a number of times of Handover of said mobile communication terminal.

22. The communication system according to claim 13, wherein said first and second base stations are base stations of a GSM (Global system Mobile Communication) system.

23. A communication method in a communication system comprising a mobile communication terminal which can communicate with a first base station, a second base station which is present within a service area of said first base station, and has a service area which is smaller than that of said first base station, and a wireless LAN access point, which is present within a service area of said second base station, said communication method comprising:

(A) receiving a specific signal transmitted from said first or second base station and determining whether or not there is a possibility that said mobile communication terminal is connected to a wireless LAN access point, based on the reception results; and (B) changing a period to monitor arrival of a beacon signal transmitted from said wireless LAN access point based on the determination result in said determination (A),
wherein the period is changed based on a probability that a connection with said wireless LAN access point can be achieved, and the period is shortened when the probability increases and is lengthened when the probability decreases.

24. The communication method according to claim 23, wherein in said (A), said mobile communication terminal acquires a data of a current position and current moving speed of said mobile communication terminal from the specific signal and determines whether or not there is the high possibility that said mobile communication terminal is connected to said wireless LAN access point, based on the data.

25. The communication method according to claim 23, wherein said first and second base stations are base stations of a WCDMA (wideband Code Division Multiple Access) system.

26. The communication method according to claim 23, wherein the specific signal is a predetermined parameter of a notice data.

27. The communication method according to claim 26, wherein the notice data is a System Information Block Type 3, and the predetermined parameter is HCS_PRIO.

28. The communication method according to claim 23, wherein the specific signal which is transmitted from said second base station is a Scrambling Code signal.

29. The communication method according to claim 23, wherein the specific signal which is transmitted from said second base station is a signal with a specific frequency.

30. The communication method according to claim 23, wherein the specific signal is a signal of data indicating a number of times of Cell Reselection by said mobile communication terminal.

31. The communication method according to claim 23, wherein the specific signal is a signal of data indicating a number of times of Handover of said mobile communication terminal.

32. The communication method according to claim 23, wherein said first and second base stations are base stations of a GSM (Global system Mobile Communication) system.

33. A non-transitory recording medium stored with a computer-readable code for a control program for a communication method in a communication system comprising a mobile communication terminal which can communicate with a first base station, a second base station which is present within a service area of said first base station, and has a service area which is smaller than that of said first base station, and a wireless LAN access point, which is present within a service area of said second base station, said control program stored in said mobile communication terminal, and making a computer to execute:

(A) receiving a specific signal transmitted from said first or second base station and determining whether or not there is a possibility that said mobile communication terminal is connected to a wireless LAN access point, based on the reception results; and (B) changing a period to monitor arrival of a beacon signal transmitted from said wireless LAN access point based on the determination result in said determination (A), wherein the period is changed based on a probability that a connection with said wireless LAN access point can be achieved, and the period is shortened when the probability increases and is lengthened when the probability decreases.

34. The non-transitory medium according to claim 33, wherein said (A) comprises:

acquiring a data of a current position and current moving speed of said mobile communication terminal from the specific signal; and determining whether or not there is the high possibility that said mobile communication terminal is connected to said wireless LAN access point, based on the data.

35. The non-transitory medium according to claim 33, wherein said first and second base stations are base stations of a WCDMA (wideband Code Division Multiple Access) system.

36. The non-transitory medium according to claim 33, wherein the specific signal is a predetermined parameter of a notice data.

37. The non-transitory medium according to claim 36, wherein the notice data is a System Information Block Type 3, and the predetermined parameter is HCS_PRIO.

38. The non-transitory medium according to claim 33, wherein the specific signal which is transmitted from said second base station is a Scrambling Code signal.

39. The non-transitory medium according to claim 33, wherein the specific signal which is transmitted from said second base station is a signal with a specific frequency.

40. The non-transitory medium according to claim 33, wherein the specific signal is a signal of data indicating a number of times of Cell Reselection by said mobile communication terminal.

41. The non-transitory medium according to claim 33, wherein the specific signal is a signal of data indicating a number of times of Handover of said mobile communication terminal.

42. The non-transitory medium according to claim 33, wherein said first and second base stations are base stations of a GSM (Global system Mobile Communication) system.

* * * * *